US006208766B1

(12) United States Patent
Schweyer et al.

(10) Patent No.: US 6,208,766 B1
(45) Date of Patent: *Mar. 27, 2001

(54) PROCESS FOR INFLUENCING THE QUALITY IMAGES FURNISHED BY AN ELECTRONIC IMAGING SYSTEM

(75) Inventors: Nikolaus Schweyer, München; Karl Dzida, Feldkirchen-Westerham, both of (DE)

(73) Assignee: Deutsche Aerospace AG, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/790,934

(22) Filed: Jan. 29, 1997

Related U.S. Application Data

(63) Continuation of application No. 08/385,925, filed on Feb. 9, 1995, now abandoned.

(30) Foreign Application Priority Data

Feb. 9, 1994 (DE) .................................................. 44 04 047

(51) Int. Cl.$^7$ ...................................................... G06K 9/40
(52) U.S. Cl. ........................... 382/274; 382/270; 358/455
(58) Field of Search .................................... 382/270, 271, 382/272, 274; 358/455, 458, 461, 465, 466

(56) References Cited

U.S. PATENT DOCUMENTS

| 3,737,854 | * | 6/1973 | Klemt | 382/270 |
| 4,187,519 | * | 2/1980 | Vitols | 358/169 |
| 4,731,865 | * | 3/1988 | Sievenpiper | 382/274 |
| 4,991,092 | * | 2/1991 | Greensite | 382/274 |
| 5,450,502 | * | 9/1995 | Eschbach | 382/274 |
| 5,454,053 | * | 9/1995 | Okubo | 382/270 |

FOREIGN PATENT DOCUMENTS

| 0 182 423 | 5/1986 | (EP) | ................................ H04N/1/40 |
| 0 238 962 | 9/1987 | (EP) | ................................ G06F/15/68 |

OTHER PUBLICATIONS

"Adaptive Contract Enhancement and De-enhancement," L. Dash and B. Chatterji, Pattern Recognition, vol. 24, No. 4, 1991, pp. 289–302.*
"Evaluation of Image Processing for Man-in-loop Target Acquisition," L. Pinson, SPIE, vol. 238, 1980, pp. 119–125.
"Two-dimensional Signal and Image Processing," J. Lim, Prentice Hall International Editions, 1990, Chapter 1, pp. 9–11 and Chapter 10, pp. 632–640.
"Adaptive Contract Enhancement and De-enhancement," L. Dash and B. Chatterji, Pattern Recognition, vol. 24, No. 4, 1991, pp. 289–302.

* cited by examiner

Primary Examiner—Matthew C. Bella
(74) Attorney, Agent, or Firm—Evenson, McKeown, Edwards & Lenahan, P.L.L.C.

(57) ABSTRACT

The process according to the invention is used for influencing the quality of images furnished by an electronic imaging system. For this purpose, image segments are defined which surround individual image points; from the image point signals of the image points situated therein, characteristic brightness and contrast values are calculated and are assigned to the individual image points. Finally, these characteristic values are used to modify the background brightness and the contrast fraction of the image point signals. According to the invention, a subset of image points are selected as supporting points and the pertaining image segments are defined in such a manner that at least areas of the image which are of interest are completely covered. By means of a two-dimensional interpolation, corresponding characteristic values each assigned to the remaining image points can be obtained from the characteristic values determined for the supporting points. The latter can, in turn, be used to modify the background brightness as well as the contrast fraction (by amplification) of the image points. It is also possible to use the characteristic values for the collective modification of all image point signals of the respective image segment.

16 Claims, 3 Drawing Sheets

PROCESS FOR INFLUENCING THE QUALITY IMAGES FURNISHED BY AN ELECTRONIC IMAGING SYSTEM

This application is a continuation of application Ser. No. 08/385,925, filed on Feb. 9, 1995, now abandoned.

BACKGROUND AND SUMMARY OF THE INVENTION

This invention relates to a process for modifying the quality of images which are furnished by an electronic imaging system in the form of image point signals representing gray-scale values.

A process of this generic type is discussed in *SPIE*, Vol. 238, "Image Processing for Missile Guidance" (1980), Pages 119 to 125. This document concerns images which are furnished by an electronic imaging system, and are composed of a plurality of image points representing gray scale values, which are distributed areally in an orderly manner. Rectangular image segments are defined around each of the individual image points, and from the image point signals f(x,y) of the image points situated within these image segments, chracteristic brightness values H representing the local brightness as well as characteristic contrast values K, representing the local contrast are calculated and assigned to the individual image points. The image point signals f(x,y) are then modified by means of these characteristic values, specifically in the sense of influencing the background brightness and the contrast component. The resulting modified image point signals g(x,y) originate from the original image point signals f(x,y) according to the following rule:

$$g(x,y)=kH+c[f(x,y)-H]/K$$

The first of these two terms may be called the background brightness and the second may be called the contrast component of the image point signal. The characteristic brightness value H is calculated in a manner which will be explained later, by taking the mean of all image points existing within the respective image segment. Therefore, it represents a characteristic brightness value which relates to this image segment; that is, which is local and which first acts as the measurement for the background brightness. The individual brightness deviation of the individual image point signals f(x,y) from the assigned characteristic brightness value H, multiplied with the quotient c/K, forms the individual contrast component of the respective image point signals. The background brightness can be varied by means of the constant k; the contrast fraction can be varied by means of the constant c. The characteristic contrast value K is derived by taking, for all image points of the respective image segment, the mean of the deviations of the individual image point signals from the characteristic brightness value, as will be explained in detail in the following. Its introduction into the above-mentioned rule has the result that the individual contrast components of the image point signals are modified inversely proportionally to the characteristic contrast value. The background brightness of the individual image points is levelled according to the background brightness of the local environment and the contrast component is amplified in the case of a slight environmental contrast and is damped in the case of a high environmental contrast.

Therefore, in this image processing method, a rectangular image segment is defined which surrounds each individual image point, all such image segments having the same size. By taking the mean of all image points situated within each such image segment, the characteristic brightness value to be assigned to the respective image segment as well as the characteristic contrast value are calculated. The image point signals are successively subjected to the modification according to the above-mentioned rule, and considerable computing expenditures are required for each individual image point. Moreover, these expenditures increase as larger image segments are selected. Such computing expenditures are not acceptable in every case.

It is therefore an object of the invention to provide a process of the initially mentioned type which minimizes computing expenditures.

This object is achieved by the image processing system according to the invention in which a separate image segment, for which the respective extensive calculations of the characteristic brightness and characteristic contrast value must be carried out, is not assigned to every individual image point within the whole image Rather only selected individual image points are utilized which, in the following, will be called supporting points. The selection is made such that, using a suitable definition of the image segments surrounding the supporting points, at least the areas of the image which are of interest (and generally therefore the whole image) are completely covered by means of these image segments. Therefore, the respective characteristic brightness and contrast values need be calculated only for a number of image segments which corresponds to the number of selected supporting points; these characteristic values are then assigned to the pertaining supporting points. Since the number of image segments necessary to cover the whole image can be orders of magnitude lower than the number of all image points existing in the image, a significant reduction of the computing expenditures is achieved. The characteristic brightness and contrast values determined for the individual image segments can then be used in the above-mentioned sense for the modification of the image point signals of the image points pertaining to the respective image segment.

To modify the image point signals furnished by the electronic imaging system as described above, the above-mentioned characteristic values are required. These may be determined from the incoming image point signals themselves, and also from the already modified image point signals.

In a first of two embodiments of the invention, based on the characteristic values assigned to the supporting points, characteristic values are generated for each of the remaining image points by means of a two-dimensional interpolation. The interpolated characteristic values are, in turn, used to modify the image point signals of the remaining image points. Thus, from the grid of the original totality of image points, a limited number of supporting points are first selected, the characteristic values are calculated only for the supporting points and, from this limited number of characteristic values, by means of a two-dimensional interpolation, a number of characteristic-value pairs are obtained which correspond to the original grid and to the original number of image points. Such interpolation is an arithmetically simple operation which requires only limited computing expenditures (much lower than the computing expenditures necessary in the case of the initially mentioned process), and does not depend on the number and size of the selected image segments. After the interpolation process is completed, similarly to the initially discussed process, an individual pair of characteristic values is assigned to each image point, so that the background brightness and the contrast component (described in detail below) can be individually modified in each case.

According to the second embodiment of the invention, the computed characteristic values are used for the collective modification of all image point signals of the respective image segment of the current image. In this case, to compute the characteristic values to be assigned to the supporting points, it is necessary to use the already modified image point signals of the preceding image.

Therefore, while, in the case of the first embodiment of the invention, modification of the individual image point signals of an image is made possible by interpolation of the characteristic values, the second embodiment is limited to carrying out the modification of the image point signals of the respective image segment in a global manner, in which case, in each new image, the result of the modification of the preceding image is taken into account by way of the characteristic values determined from the latter.

As a further development of the second embodiment, the respective characteristic contrast values are evaluated and the image point signals are modified as a function of the result of this evaluation in different manners. On the one hand, when a characteristic contrast value within an image segment is too low, the background brightness of the image point signals of the preceding image may be maintained and only the contrast fraction may be amplified. On the other hand, when a characteristic contrast value is high enough, the background brightness may be either reduced or increased, depending on whether the pertaining characteristic brightness value is found to be high or low, based on a predetermined characteristic criterion.

Other objects, advantages and novel features of the present invention will become apparent from the following detailed description of the invention when considered in conjunction with the accompanying drawings.

DETAILED DESCRIPTION OF THE DRAWINGS

Figure 1:
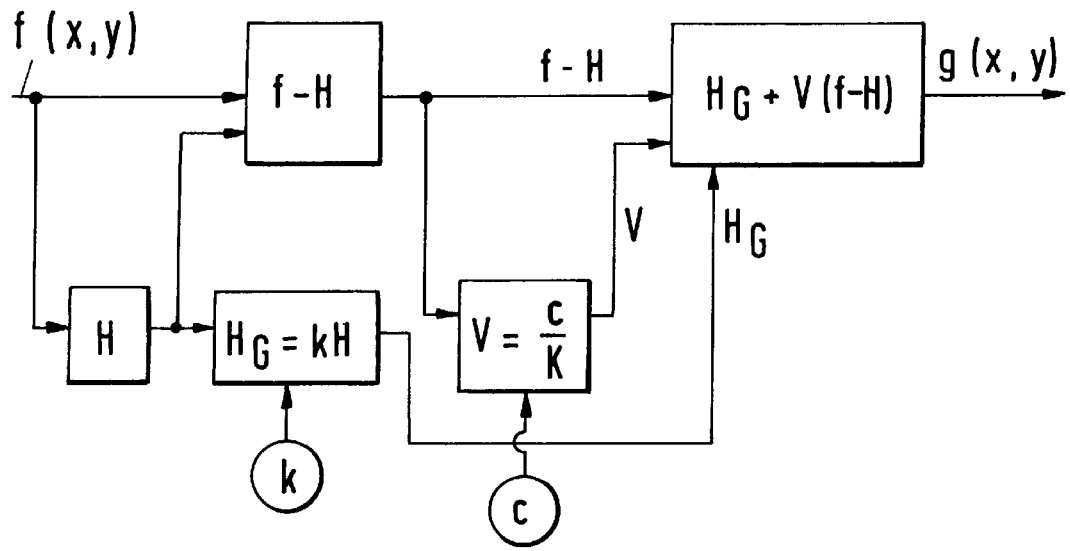
FIG. 1 is a block diagram of the known process.

FIG. 1 is a schematic representation of the initially discussed process, in which image point signals f(x,y) furnished by an electronic imaging system, are converted to modified image point signals g(x,y). The coordinates x,y indicate that the image points are to be arranged in an orthogonal system of coordinates, for which an orderly, line-shaped and column-shaped arrangement within a rectangularly or quadratically bounded image plane is preferred. Here, x is the column coordinate; y is the line coordinate. The image points follow one another at regular distances in the direction of these coordinates. The image point signals f(x,y) correspond to the gray scale values assigned to each image point.

In the known process, the image segment assigned to each individual image point may be, for example, rectangular, with the image point situated in the center. For this image segment, a characteristic brightness value is computed, which is representative of the local brightness in the environment of this image point, specifically within the assigned image segment. This may be done, for example, by taking the mean brightness of all image points situated within this image segment according to the following rule:

$$H = \frac{1}{N}\sum_{j=1}^{N} f_j(x, y)$$

Here, the mean is taken of N image point signals of all image points situated within the respective image segment. The characteristic brightness value H thus computed is then used to determine a value for the background brightness $H_G$ of the modified image point signal g(x,y), according to the rule:

$$H_G = kH$$

wherein k is a constant representing a desired influencing of the background brightness of the modified image point signal. At the same time, the differences f(x,y)–H are calculated and are then used to determine an amplification factor V=c/K. For this purpose, the characteristic contrast value K is computed by taking a mean of all image point signals of the particular image segment, according to the following rule:

$$K = \left\{\frac{1}{N}\sum_{j=1}^{N} [f_j(x, y) - H]^2\right\}^{1/2}$$

Finally, the modified image point signal g(x,y) is derived from the difference f(x,y)–H, the background brightness value $H_G$ and the amplification factor V, formed according to the following rule:

$$g(x,y) = H_G + V[f(x,Y) - H]$$

Therefore, in the known process, two different types of mean values are computed for each individual image point (each individual image point signal) based on all image points within the surrounding image segment. Specifically, for each image point, a mean is calculated once during the determination of the characteristic brightness value H, and again during the determination of the characteristic contrast value K. These extensive calculations are carried out for the purpose of modifying each individual image point signal of the whole image. The computing expenditures required for this purpose obviously increase with the size of the image segments assigned to the image points per definition. The extent to which the further environment of the image point has an effect during the modification also depends on the segment size. The modified image point signal g(x,y) consists of a first summand $H_G$, which corresponds to a background brightness, and a second summand which reflects an individual contrast component formed by a product from the above-mentioned amplification factor V and the difference f(x,y)–H. The individual deviation of the respective image point signals f(x,y) from the local brightness, given by the characteristic brightness value H, is also amplified by the amplification factor V when the local contrast, represented by the characteristic contrast value K, is small, and is damped when the local contrast is large.

Figure 2:
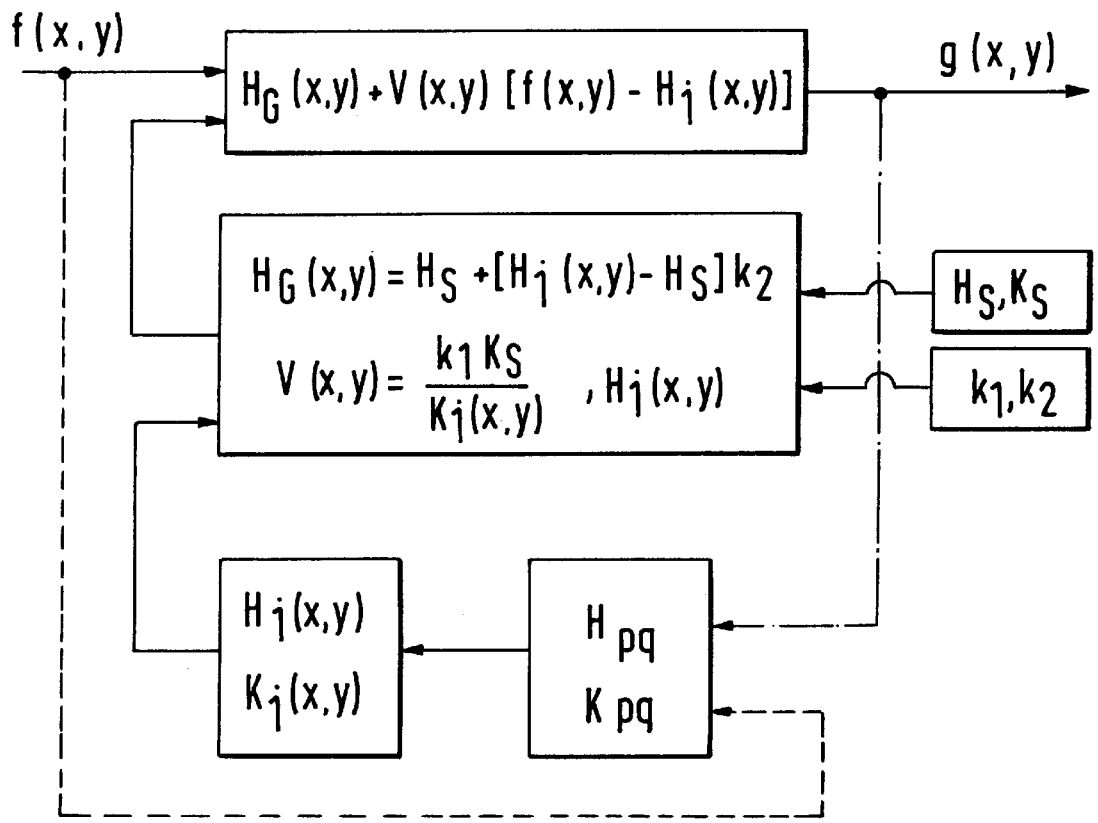
FIG. 2 is a block diagram of the first main variant of the invention.
Figure 4:
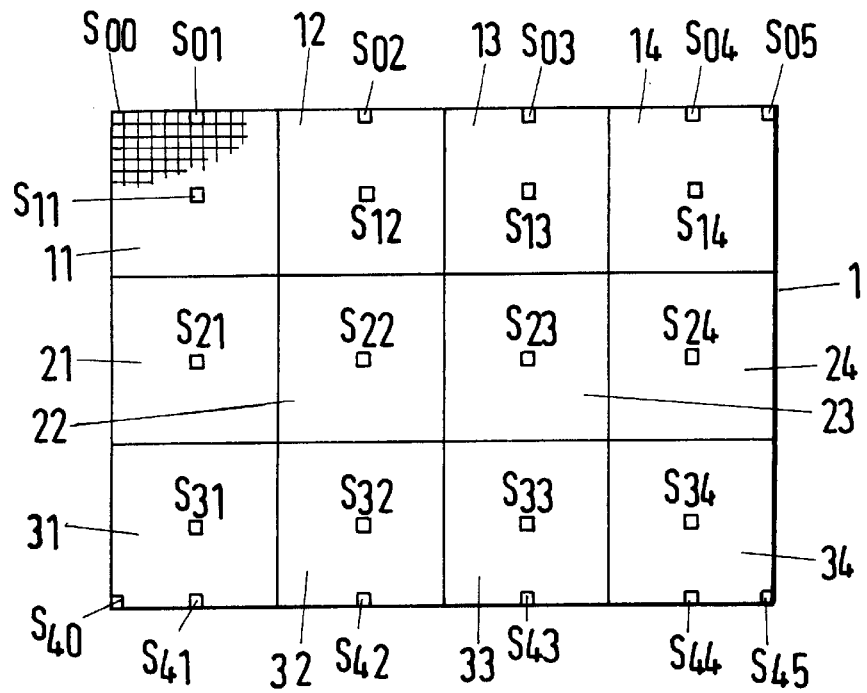
FIG. 4 is a view of an image divided into image segments with assigned supporting points.

FIG. 2 illustrates schematically how the disadvantages of the known process caused by high computing expenditures can be avoided according to a first embodiment of the invention. First a plurality of supporting points is selected (that is, individual image points which are distributed over the image surface in a regularly spaced manner), each being designated by a line index p and a column index q. For each of these supporting points $S_{pq}$, an image segment is defined. Such image segments may, for example, be rectangular, with dimensions such that all image segments cover the whole image almost completely, if possible without gap or overlapping. An example of such an arrangement of image segments and supporting points is shown in FIG. 4. By taking the mean of all image points situated within the respective assigned image segment, the pertaining characteristic brightness values $H_{pq}$ as well as characteristic contrast values $K_{pq}$ are calculated. This may take place, for example, according to the above-mentioned rule for computing the corresponding characteristic values H and K.

Referring again to FIG. 2, calculation of the above-mentioned characteristic values may be based on the image point signals f(x,y) just furnished by the electronic imaging system (interrupted connecting line) in the manner of a control; however, the already modified image point signals g(x,y) may also be used (dash-dotted line) in a control loop.

Subsequently, based on the characteristic value pairs $H_{pq}$ and $K_{pq}$ of the supporting points, characteristic values $H_i(x,y)$ as well as $K_i(x,y)$ are calculated by two-dimensional interpolation, for all image points within the image. Thus, a change takes place again from the relatively wide-meshed grid of the supporting points to the fine-meshed grid of the original image points, with an individual pair of characteristic values assigned to each of these image points, but not determined in the manner of the known process with its high computing expenditures. These individual characteristic values are then used to modify the corresponding image point signals f(x,y) in the sense of influencing their background brightness as well as their contrast fraction.

This may take place in the manner illustrated in FIG. 2 according to the following rules:

$$V(x,y) = k_1 K_s / K_i(x,y)$$

$$H_G(x,y) = H_s + [H_i(x,y) - H_s]k_2$$

In addition to the presettable constants $k_1$ and $k_2$, a desired background brightness value $H_s$ and a comparative value $K_s$ for the contrast are entered into these calculations. These values may (but need not) be uniformly selected for the whole image. To a greater or lesser extent, the presettable desired background brightness value $H_s$ determines the background brightness of the image points. For $k_2=0$, it is identical with the latter; for $k_2=1$, it disappears completely, so that only the individual interpolated characteristic brightness value $H_i(x,y)$ affects the image point background brightness. The parameter $k_2$ may therefore be selected within a value range of $0 \leq k_2 \leq 1$. The computing rule therefore makes it possible to adapt the background brightness of the image points in a more or less pronounced manner to a presettable desired value. However, it is also possible to influence the background brightness without presetting such a desired value, for example, in the above-described known manner:

$$H_G(x,y) = k H_i(x,y)$$

The modified image point signal g(x,y) is then be formed from the background brightness and the contrast component according to the following rule:

$$g(x,y) = H_G(x,y) + V(x,y)[f(x,y) - H_i(x,y)]$$

Depending on the type of image scanning as well as the sequence of the interpolation steps, a period of time is required for calculation of the values for background brightness and the amplification for modifying the individual image point signals. The image point signals furnished by the electronic imaging system must therefore be stored for a corresponding time period in a memory before they are finally modified according to the above rule.

Heretofore, it was assumed that the characteristic brightness and contrast values are computed by taking the mean of all image points contained in the respective image segment according to the rules previously indicated. However, it is also possible to define these characteristic values in a different manner.

Thus, for example, within a given image segment, an upper and a lower signal threshold $U_o$ and $U_u$ may be set, approximately symmetrically with respect to the center of the control range, e.g. such that their difference $U_o - U_u$ amounts to just half the control range. The individual image point signals within the image segment are then examined to determine whether their signal level is above the upper or below the lower signal threshold. The corresponding numbers are called $N_o$ and $N_u$, which are the number of "aberrant values" whose signal levels are outside the partial range indicated by the above-mentioned signal thresholds. The characteristic brightness and contrast values H and K will then be defined in the following manner:

$$H = (N_o - N_u)/N$$

$$K = (N_o + N_u)/N$$

wherein N is the total number of image points contained in the image segment in question. It may therefore happen in this case that the characteristic brightness value H may assume negative values or may be 0; the characteristic contrast value K, on the other hand, may not be negative. A poor utilization of the control range will exist when K=0 (the signal levels of all image point signals being therefore within the partial range bounded by the two above-mentioned signal thresholds). In such a case, a modified intervention should take place for the corresponding image segment which leads to a better utilization of the upper and lower regions of the control range. If a positive characteristic contrast value exists, the modifying intervention should have the effect that the number of "aberrant values" above and below the two above-mentioned signal thresholds are in a somewhat balanced relationship with respect to one another.

Figure 3:
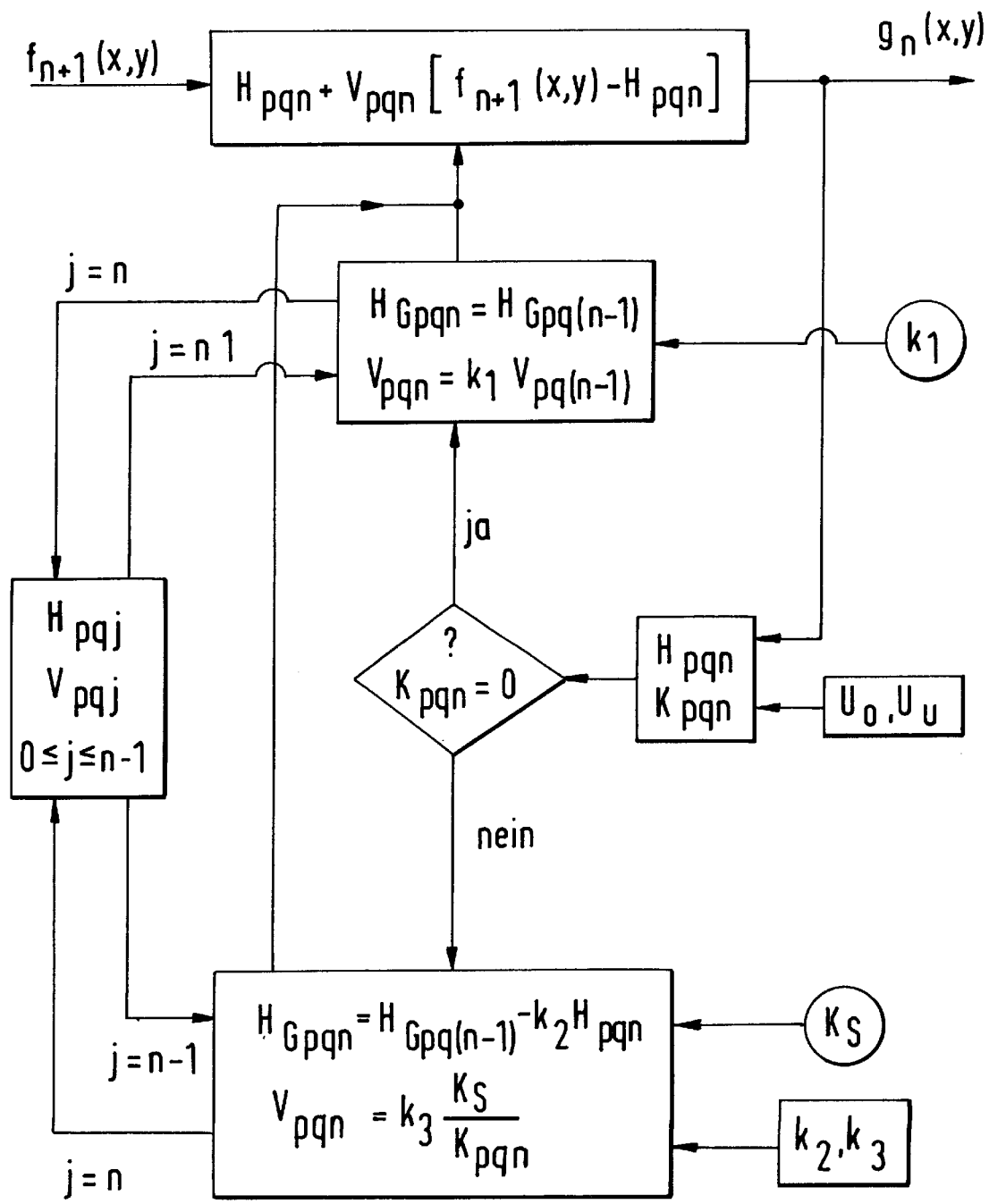
FIG. 3 is a block diagram of the second main variant of the invention.

These requirements are taken into account in the case of the process schematically illustrated in FIG. 3, which is a variant of the second embodiment of the invention. In this case the calculations are based on the already modified image point signals $g_n(x,y)$ of the preceding image in order to modify the image point signals $f_{n+1}(x,y)$ of the current image.

In this case also, as described above, supporting points are selected and assigned image segments are defined. While taking into account upper and lower signal thresholds $U_o$ and $U_u$, a characteristic brightness value $H_{pqn}$ and a characteristic contrast value $K_{pqn}$ are computed for each image segment, as described above. The characteristic contrast value $K_{pqn}$ is then subjected to an evaluation as to whether the following applies: $K_{pqn}=0$ or $K_{pqn}>0$. In the former case, the background brightness of the image points within the respective image segment is maintained, and the amplification of the contrast is component is amplified according to the rules:

$$H_{pqn} = H_{Gpq(n-1)}$$

$$V_{pqn}=k_1 V_{pq(n-1)}$$

wherein $k_1>1$. The indices n−1, n, n+1, etc., in each case, relate to images which immediately follow one another in time. From one image to the next, this leads to a step-by-step increase of the contrast component within the respective image segment with the result that finally the requirement $K_{pqn}=0$ will no longer be met and therefore "aberrant values" occur for the first time.

In this case when "aberrant values" occur, from the start, that is, in the second of the above-mentioned two cases, the background brightness will now be modified, specifically according to the following rule:

$$H_{Gpqn}=H_{Gpq(n-1)}-k_2 H_{pqn}$$

Therefore, in this case, the background brightness within the respective image segment is reduced in comparison to that of the preceding image (n−1) when the pertaining characteristic brightness value $H_{pqn}$ is positive and is increased when this value is negative. The signal levels of all image point signals within the respective image segment are therefore increased jointly when too many "aberrant values" fall in the lower control range, and are lowered when too many "aberrant values" fall in the upper control range.

The following will then be arranged for the amplification $V_{pqn}$:

$$V_{pqn}=k_3 K_s|K_{pqn}$$

with a presettable constant $k_3$ as well as a comparative value $K_s$.

The newly calculated values $H_{Gpqn}$ and $V_{pqn}$ are then, in each case, put into a memory from which the preceding values for (n−1) are also taken, if required.

Finally, the current image point signals $f_{n+1}(x,y)$ are modified according to the formula:

$$g_{n+1}(x,y)=H_{Gpqn}+V_{pqn}[f_{n+1}(x,y)-H_{pqn}]$$

The current image point signals (n+1) are therefore modified with respect to the background brightness and the contrast component by means of correcting quantities which are obtained from the already modified image point signals of the preceding image.

Another possibility for defining the characteristic brightness and contract values consists of determining upper and lower signal levels $V_o$ and $V_u$ for each image segment such that, for example, 10% of all image point signals situated within the image segment are above $V_o$ and 10% are below $V_u$. In this variant, it is necessary first to collect all image point signals of one image segment, because the determination of the upper and lower signal levels cannot be made beforehand. When all N image point signals are available, the 10% with the highest, and 10% with the lowest, signal levels can then be subtracted which results in the position of $V_o$ and $V_u$. The two above-mentioned characteristic values H and K may then be determined according to the following rules:

$$H=(V_o+V_u)/2$$

$$K=V_o-V_u$$

The thus determined characteristic values can at least never be negative. The characteristic contrast value will always be relatively low if the image point signals of all image points within the respective image segment are situated relatively near one another. However, the characteristic contrast value increases with an increasing number of image point signals which arrive with their signal levels in the proximity of the upper and lower boundaries of the control range. A corresponding situation exists for the characteristic brightness value. This type of characteristic value definition may also be used in the case of the process according to FIG. 2.

FIG. 4 is a schematic view of the structure of an image 1. In this case, the image surface is divided into twelve rectangular image segments numbered 11 to 34 which are each arranged around and assigned to supporting points $S_{11}$ to $S_{34}$. Each of the image segments contains a plurality of N image points which are arranged in lines and columns, as partially shown in the case of image segment 11, but are otherwise not illustrated. One such image point in each case is selected as the supporting point. In the present embodiment, the supporting points themselves are arranged in three lines and four columns. The line index p extends from 1 to 3; the column index q extends from 1 to 4. A division of the whole image 1 in such an orderly manner by means of rectangular image segments 11 to 34, which directly adjoin one another, and neither overlap nor have gaps, is expedient but is not the only possible selection of supporting points and the definition of image segments. For example, the image segments do not always have to have the same shape or the same size; overlapping or gaps may also occur.

As mentioned above, in the case of a first embodiment of the invention, following the selection of the supporting points and the definition of the pertaining image segments, a pertaining pair of characteristic brightness and contrast values is calculated for each image segment. Thereafter, a two dimensional interpolation is performed in order to assign to each of the individual image points of the whole image its own pair of characteristic values. For this purpose, first additional supporting points $S_{01}$ to $S_{04}$ as well as $S_{41}$ to $S_{44}$ may be added on the upper and lower edges of the image 1, situated in the same columns as the already selected supporting points $S_{11}$ to $S_{34}$ in the interior of the image. In the simplest case, the characteristic values of the respective nearest supporting points $S_{11}$, etc. may then be assigned directly to these additional supporting points $S_{01}$ to $S_{44}$ (The same procedure may also be applied to the right and the left edges of the image 1 as well as on the image points situated in the corners of the image the latter being shown in FIG. 4, as additional supporting points $S_{00}$ to $S_{45}$.) The interpolation may then take place in such a manner that a linear vertical interpolation is first performed in the columns containing the supporting points, thus, for example, $S_{01}$ to $S_{41}$; thus the characteristic value pairs are determined for all image points situated within these selected columns. Based on the above, corresponding horizontal interpolations can then be carried out in all image point lines so that one pair of characteristic values will then be assigned to each individual image point of image 1 at least by interpolation.

Figure 5:
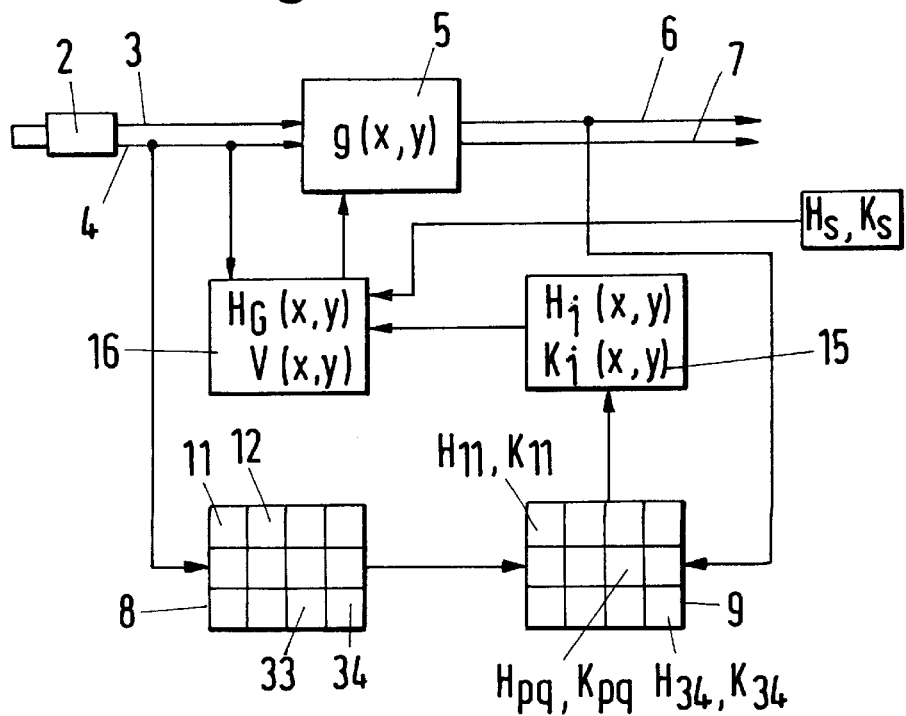
FIG. 5 is a view of a system for implementing the process according to the first embodiment of the invention.

FIG. 5 is a schematic view of a system for carrying out the process according to the first embodiment of the invention. By way of a first line 3, a video camera 2 furnishes image point signals which correspond to a structuring of the image into discrete image points arranged in lines and columns. On a second line 4, synchronization signals are emitted simultaneously. The two above-mentioned lines first lead to a modification circuit 5 which has computing as well as storage functions. By means of the synchronization signals, the image segments 11 to 34 may be determined in a selection circuit 8. In a determination circuit 9, the characteristic value pairs $H_{pq}$ and $K_{pq}$ for the supporting points are then calculated which are each assigned to the individual image segments and are not shown here. In the case of FIG. 5, this takes place in a control loop by means of the image point signals already modified in the modification circuit 5. These are emitted by way of a first output line 6, while the output of the synchronization signals takes place by way of a second output line 7. As described in detail above, in an interpolation circuit 15, characteristic value pairs are now determined which pertain by interpolation to all individual image points of the whole image 1. From these, in turn, in a processing circuit 16, the background brightness $H_G$ as well as the amplification V for the contrast component are then calculated per image point as correcting quantities, for example, as explained above in conjunction with FIG. 2. These correcting quantities are then fed to the modification circuit 5 in which the individual image point signals of the just incoming or last arrived image are modified, preferably also in the manner described in conjunction with FIG. 2. The desired and comparative values $H_s$ and $K_s$ for the background brightness and the contrast are also fed into the processing circuit 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for modifying the quality of images furnished by an electronic imaging system in the form of a set of image point signals representing gray-scale values, said images, in each case, being composed of a set of image points which are areally distributed in an orderly manner, said process comprising:

defining image segments surrounding individual image points;

determining a characteristic brightness value representing local brightness, and a characteristic contrast value representing local contrast, for each image segment, based on the image point signals of image points situated within such image segment; and modifying a background brightness and contrast component for each of the image point signals based on said characteristic values;

wherein said step of defining image segments surrounding individual image points comprises:

selecting a subset comprising a limited number of supporting points $S_{pq}$ from among said set of image points; and defining image segments surrounding each supporting point such that said image segments cover completely at least a selected area of said image; and wherein said characteristic brightness and contrast values $H_{pq}$, $K_{pq}$ are determined based on previously modified image point signals of a preceding image.

2. Process according to claim 1 wherein the calculated brightness values $H_{pq}$ and contrast characteristic values $K_{pq}$ are used for the collective modification of all image point signals of the respective image segment of the current image.

3. Process according to claim 2 wherein the respective characteristic contrast values $K_{pq}$ are evaluated and, for the modification, when a characteristic contrast value within the respective image segment is lower than a first desired value $V_u$, background brightness $H_G$ of the image point signals of the preceding image may be maintained and the contrast component is amplified and, when the characteristic contrast value is higher than a second desired value $V_o$, background brightness $H_G$ in the case of a high characteristic brightness value $H_{pq}$ is reduced and in the case of a low characteristic brightness value, is increased.

4. Process according to claims 3 wherein the evaluation criterion for the characteristic contrast values $K_{pq}$ is $K_{pq}=0$ (low characteristic contrast value) or $K_{pq}>0$ (high characteristic contrast value).

5. Process according to claim 4 wherein the case of $K_{pq}>0$, the differentiating criterion for the characteristic brightness value $H_{pq}$ is $H_{pq}>0$ (high characteristic brightness value) or $H_{pq}<0$ (low characteristic brightness value).

6. Process according to claim 1 wherein the characteristic brightness and contrast values are computed according to the following rules:

$$H_{pq}=(N_o-N_u)/N$$

$$K_{pq}=(N_o+N_u)/N$$

wherein N is a number of image points situated within the respective image segment, and $N_o$ and $N_u$ are numbers of image points within the image segment whose signal levels are above a presettable upper signal threshold $U_o$ and below a presettable lower signal threshold $U_u$, which thresholds bound a signal range.

7. Process according to claim 6 wherein the upper and lower signal thresholds are situated symmetrically with respect to a center of the signal range.

8. Process according to claim 7 wherein the difference between the upper and lower threshold values $U_o$-$U_u$ amounts to half of said control range.

9. Process according to claim 1 wherein the characteristic brightness and contrast values are computed according to the following rules $$H=(V_o+V_u)/2$$

$$K=V_o-V_u$$

where $V_o$ is an upper and $V_u$ a lower signal level such that a wanted percentage of all image point signals situated within the image segment are above $V_o$ and another wanted percentage are below $V_u$.

10. Process for modifying the quality of images furnished by an electronic imaging system in the form of a set of image point signals representing gray-scale values, said images, in each case, being composed of a set of image points which are areally distributed in an orderly manner, said process comprising:

defining image segments surrounding individual image points;

determining a characteristic brightness value representing local brightness, and a characteristic contrast value representing local contrast, for each image segment, based on the image point signals of image points situated within such image segment; and modifying a background brightness and contrast component for each of the image point signals based on said characteristic values;

wherein said step of defining image segments surrounding individual image points comprises:

selecting a subset comprising a limited number of supporting points $S_{pq}$ from among said set of image points; and defining image segments surrounding each supporting point such that said image segments cover completely at least a selected area of said image;

wherein said step of determining characteristic values comprises:

determining a characteristic brightness value and a characteristic contrast value for each supporting point based on image point signals of image points situated within an image segment surround such supporting point;

performing a two dimensional interpolation between the characteristic brightness and contrast values for adjacent supporting points to determine characteristic brightness and contrast values for intermediate image points therebetween;

wherein a preset desired background brightness value is used to modify the respective background brightness $H_G$ of the image point signals in addition to the respective characteristic brightness value; and wherein the background brightness $H_G$ of the image point signals is determined according to the rule $$H_G = H_s + k_2(H_t - H_s),$$

with $0 \leq k_2 \leq 1$.

11. Process for modifying the quality of images furnished by an electronic imaging system in the form of a set of image point signals representing gray-scale values, said images, in each case, being composed of a set of image points which are areally distributed in an orderly manner, said process comprising:

defining image segments surrounding individual image points;

determining a characteristic brightness value representing local brightness, and a characteristic contrast value representing local contrast, for each image segment, based on the image point signals of image points situated within such image segment; and modifying a background brightness and contrast component for each of the image point signals based on said characteristic values;

wherein said step of defining image segments surrounding individual image points comprises:

selecting a subset comprising a limited number of supporting points $S_{pq}$ from among said set of image points; and defining image segments surrounding each supporting point such that said image segments cover completely at least a selected area of said image;

wherein said step of determining characteristic values comprises:

determining a characteristic brightness value and a characteristic contrast value for each supporting point based on image point signals of image points situated within an image segment surround such supporting point; and performing a two dimensional interpolation between the characteristic brightness and contrast values for adjacent supporting points to determine characteristic brightness and contrast values for intermediate image points therebetween; and wherein a comparative value $K_s$ for contrast is given which, during modification of the respective contrast fraction of the image point signals appears in the numerator of an amplification factor V constructed as a quotient with the respective characteristic contrast value $K_t(x,y)$ as the denominator.

12. Process for modifying the quality of images furnished by an electronic imaging system in the form of a set of image point signals representing gray-scale values, said images, in each case, being composed of a set of image points which are areally distributed in an orderly manner, said process comprising:

defining image segments surrounding individual image points;

determining a characteristic brightness value representing local brightness, and a characteristic contrast value representing local contrast, for each image segment, based on the image point signals of image points situated within such image segment; and modifying a background brightness and contrast component for each of the image point signals based on said characteristic values;

wherein said step of defining image segments surrounding individual image points comprises:

selecting a subset comprising a limited number of supporting points $S_{pq}$ from among said set of image points; and defining image segments surrounding each supporting point such that said image segments cover completely at least a selected area of said image;

wherein said step of determining characteristic values comprises:

determining a characteristic brightness value and a characteristic contrast value for each supporting point based on image point signals of image points situated within an image segment surround such supporting point;

performing a two dimensional interpolation between the characteristic brightness and contrast values for adjacent supporting points to determine characteristic brightness and contrast values for intermediate image points therebetween;

wherein a preset desired background brightness value is used to modify the respective background brightness $H_G$ of the image point signals in addition to the respective characteristic brightness value; and wherein desired and comparative values are uniformly selected for the whole image.

13. A process for modifying an electronic image furnished in the form of a set of image point signals representing respective gray scale values for a set of image points which are areally distributed in an orderly manner, said process comprising:

selecting from among said set of image points a plurality of supporting points dispersed throughout said image;

defining respective image segments surrounding said supporting points, said image segments collectively including at least all areas of interest in said electronic image;

for each particular image segment, determining a local brightness characteristic value which is equal to a mean gray scale value for all image points existing therein;

for each particular image segment, determining a local contrast characteristic value which is equal to a mean deviation of gray scale values for all image points existing within the particular image segment from the local brightness characteristic value determined for the particular image segment;

determining local brightness and local contrast characteristic values for all image points within said image other than supporting points, as a function of local brightness and local contrast characteristic values determined for the image segments;

expressing a gray scale value for each particular image point as the sum of a background brightness component based on the local brightness characteristic value determined for the particular image point, and a contrast component based on the local contrast characteristic value determined for the particular image point; and independently modifying at least one of said background brightness components and said contrast components by means of said local brightness and local contrast characteristic values.

14. The process according to claim 13 wherein determining of local brightness and local contrast characteristic values for all image points within said image other than supporting points comprises a two dimensional interpolation based on local brightness and local contrast characteristic values determined for said supporting points.

15. The process according to claim 13 wherein said independently modifying comprises multiplying said local brightness characteristic values by a first factor and multiplying a reciprocal of said local contrast characteristic value by a second factor.

16. The process according to claim 13 wherein said determining local brightness and local contrast characteristic values for all image points other than supporting points is performed on the basis of already modified image point signals determined for a preceding image.

* * * * *